United States Patent
Roos

(10) Patent No.: US 7,991,145 B2
(45) Date of Patent: Aug. 2, 2011

(54) DRIVE AND POSITIONING METHOD AND SYSTEM FOR AUTOMATED SWITCH MATRIX

(76) Inventor: Sture Roos, Mongagua (BR); Johan Öberg, legal representative, Stockholm (SE)

( * ) Notice: Subject to any disclaimer, the term of this patent is extended or adjusted under 35 U.S.C. 154(b) by 744 days.

(21) Appl. No.: 10/597,209

(22) PCT Filed: Jan. 14, 2005

(86) PCT No.: PCT/IB2005/050164
§ 371 (c)(1),
(2), (4) Date: Jan. 9, 2009

(87) PCT Pub. No.: WO2005/071979
PCT Pub. Date: Aug. 4, 2005

(65) Prior Publication Data
US 2010/0008494 A1 Jan. 14, 2010

(30) Foreign Application Priority Data
Jan. 19, 2004 (SE) ........ 0400095

(51) Int. Cl.
*H04M 3/00* (2006.01)
(52) U.S. Cl. ........ 379/327; 379/306
(58) Field of Classification Search ........ 379/291, 379/292, 303, 306, 335, 327; 340/2.1, 2.2
See application file for complete search history.

(56) References Cited

U.S. PATENT DOCUMENTS

| 4,571,721 A * | 2/1986 | Yasui et al. ........ 370/380 |
| 4,817,134 A * | 3/1989 | Pickens et al. ........ 379/291 |
| 5,790,651 A * | 8/1998 | Suzuki et al. ........ 379/327 |
| 5,994,862 A * | 11/1999 | Ejiri et al. ........ 318/568.12 |
| 6,138,345 A * | 10/2000 | Suzuki et al. ........ 29/739 |

FOREIGN PATENT DOCUMENTS
WO 0239473 A1 5/2002
* cited by examiner

Primary Examiner — Fan Tsang
Assistant Examiner — Akelaw A Teshale
(74) Attorney, Agent, or Firm — Albihns.Zacco AB

(57) ABSTRACT

A method and system for automating a switch matrix board for cross-connecting any line in a set of input lines to any line in a set of output lines, to be used e.g. in automating cross-connects for line pairs in a central office main distribution frame (MDF) of a telecommunication network. The switch matrix (100) comprises a plurality of contact sledges (130) driven by a plurality of sledge positioning screws (120) that slidably engage a plurality of main contact pads (110) to cross-connect the lines. In an embodiment of the invention, two electric motors cooperate to position a lateral drive gear (158) to engage and rotate a selected sledge positioning screw (120), which moves the contact sledge. In another embodiment, a single electric motor operates together with a magnetic clutch assembly (180) to position the lateral drive gear to rotate the sledge positioning screw (120). A controller unit is connected to a position detection system and to the motors to accurately position the contact sledge (130) on the switch matrix board.

14 Claims, 8 Drawing Sheets

DRIVE AND POSITIONING METHOD AND SYSTEM FOR AUTOMATED SWITCH MATRIX

FIELD OF THE INVENTION

The present invention relates generally to telecommunication network infrastructure, and more particularly, to a method and system for automating switch matrices for performing cross-connects using drive means and position detection for improved operation.

BACKGROUND OF THE INVENTION

In a typical telecommunication network, the central office houses a telephone exchange to which subscriber home and business lines are connected to the network on what is called a local loop. Many of these connections to residential subscribers are typically made using a pair of copper wires, also referred to as a twisted pair, that collectively form a large copper network operated by the telecom provider. Within the central office the line connections between the exchange side and the subscriber side are terminated at a main distribution frame (MDF), which is usually the point where cross-connections between the subscriber lines and the exchange lines are made. Virtually all aspects of the telecommunication network are automated with the notable exception of the copper network. Management of the copper infrastructure is a highly labor intensive process that results in one of the most significant costs faced by telecommunication providers. This is because the central office made traditionally dispatches technicians to the MDF site to manually install cross-connects using jumper wires or to analyze or test the lines in the copper network.

As a result service providers have long desired to reduce the amount of labor required to maintain and manage copper infrastructure by automating the process of making; removing, or modifying cross-connects for line pairs in the MDF. A number of automated cross-connect solutions have been developed and marketed in recent years. Many of these products implement an automated switching matrix using electromechanical relays or robotic technologies to make the cross-connects. A major drawback with the use of electromechanical relays is that their physical size limits the capacity of the switch matrix. In other words, to handle more lines more relays must be added, which is generally very difficult given the space limitations of the matrix. Moreover, robotic solutions tend to exhibit reliability and maintenance issues over the long term that tend to increase costs. While the prior art solutions have existed for some time, none of them have been able to fulfill requirements for cost-effectiveness and scalability required by telecom service providers.

U.S. Pat. No. 4,817,134 discloses an automated switch matrix for cross-connect connecting a set of line pairs within a single plane. The cross-connects on the switch matrix are made using movable shorting elements 24 to electrically connect a first set of line pairs to a second set of perpendicular oriented line pairs. The contact elements are moved into position by rotating positioning screws by two stepper motors operating in combination. The first stepper motor operates to turn a motor positioning screw 37 in order to move the second stepper motor to a desired position in front of the selected shorting element positioning screw 26. The second stepper motor operates to move the shorting element to the cross-connect the line pair. A disadvantage of the switch matrix described is the limited number of line pairs it can cross-connect and lack of scalability to handle growth in the number of lines in the central office. Since the capacity of the switch matrix is designed in from the start it is difficult to add switching capacity as conditions dictate in high-growth markets.

Another drawback is that the switch matrix described does not provide a way to determine the position of the shorting elements. Although it is theoretically possible to calculate position of the shorting elements by counting the stepper motor pulses, the position information would be lost if there is a power outage or if loss of synchronization occurs if the gears slip, for example. Recovering the position information would require moving the contact elements to a reset position thereby causing highly undesirable service interruptions for the existing connections. Without precise position information on the shorting elements it is not possible to perform maintenance functions such as cleaning the contact points by periodically moving the shorting elements slightly back and forth without breaking existing connections. Moreover, the reciprocating action enables the drive elements to be "exercised" during long periods of inactivity, which can increase the service life of the device.

In view of the foregoing, it is desirable to provide an automated switch matrix with a drive mechanism and positioning system that is reliable, economical and overcomes the disadvantages of the prior art.

SUMMARY OF THE INVENTION

Briefly described and in accordance with embodiments and related features of the invention, there is provided a method and system for automating a switch matrix board for cross-connecting a line in a set of input lines to a line in a set of output lines, such as in automating cross-connects for line pairs in a central office main distribution frame (MDF) of a telecommunication network, for example. The switch matrix board comprises a plurality of interconnected main contact pads disposed thereon for cross-connecting the lines. Furthermore, a plurality of contact sledges driven by drive means that include a plurality of sledge positioning screws for slidably engaging the contact sledge with the main contact pads. In a first embodiment of the invention, the drive means include driving each of the sledge positioning screws with an electric stepper motor, for example. In a second embodiment, two stepper motors cooperate to turn respective lateral positioning screws to move a lateral drive gear into position to engage and rotate a selected sledge positioning screw. In a third embodiment, a single electric motor operating with a magnetic clutch assembly is used to position the lateral drive gear to engage the selected, sledge positioning screw. A controller on the switch matrix board is connected to a position detection system and to the motors to enable accurate positioning of the contact sledge on the switch matrix board.

In a method aspect of the invention, there is provided method of automating the switch matrix board described above. With the lateral drive gear engaged between a first and a second lateral positioning screws, when rotating the first lateral positioning screw in either a clockwise or counter-clockwise direction, while keeping the second lateral positioning screw stationary, induces lateral movement of the lateral drive gear in either the left or right direction. This moves lateral chive gear into position to engage the selected sledge positioning screw. When the lateral positioning screws are synchronously rotated in opposite directions, the lateral drive gear remains stationary and rotates the sledge positioning screw, which moves the contact sledge. The controller uses the position detection system for accurately positioning the contact sledge on the matrix.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

The automated switch matrix of the present invention can be used in modular cross-connect boards that can be insert into or attached to standard MDF termination blocks. By way of example, the present invention is suitable for use in the interconnected modular cross-connect boards used in the Nexa automated cross-connect system by Network Automation AB of Stockholm, Sweden. The termination blocks used in MDFs are basically similar, however, there are minor variations that are in use, the most common being the LSA-Plus termination block manufactured by KRONE Inc., a subsidiary of GenTek Inc. of Hampton, N.H., USA. In this particular configuration the cross-connect boards are inserted directly into the KRONE termination blocks.

Switch Matrix Board

Figure 1:
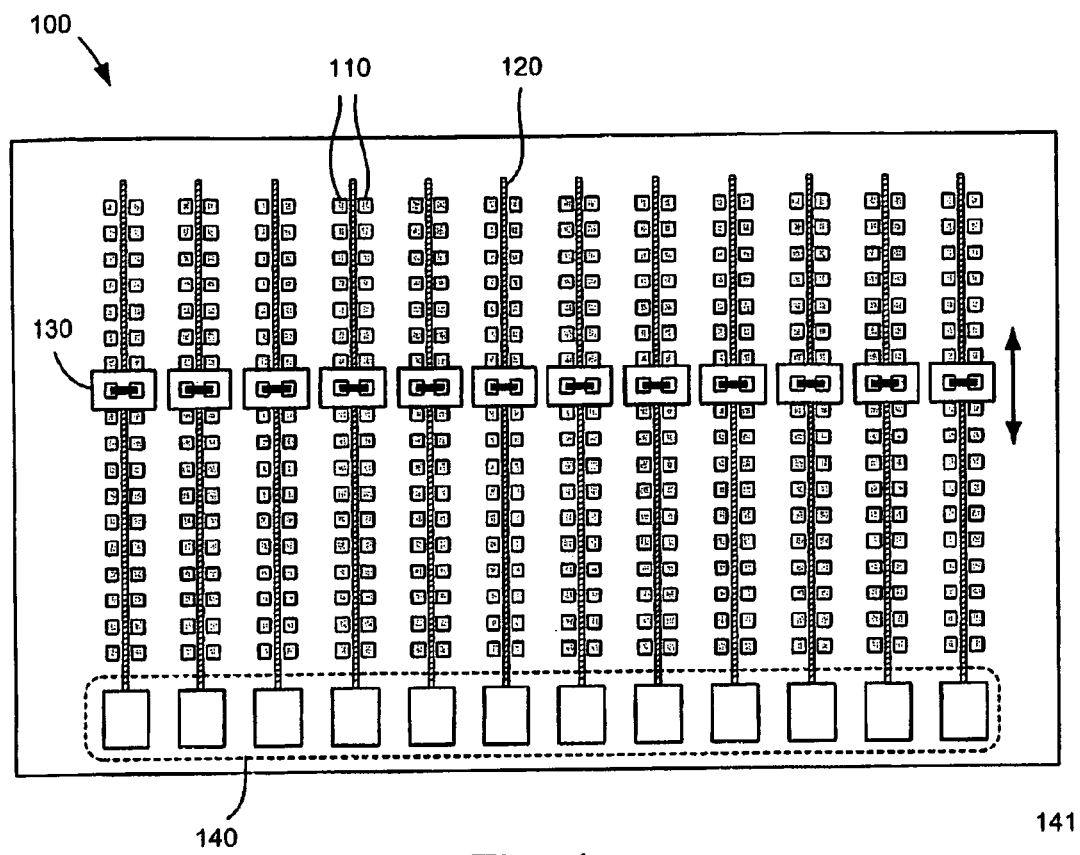
FIG. 1 shows a diagrammatic top view of an exemplary automated switch matrix operating in accordance with a first embodiment of the invention.

FIG. 1 shows a diagrammatic top view of an exemplary automated switch matrix operating in accordance with a first embodiment of the invention. The switch matrix 100 is configured for cross-connecting a number of input line pails to a number of output line pairs. The switch matrix board comprises a plurality of electrically conducting contact pads 110 that are formed into a printed circuit board (PCB). The contact pads are arranged into a plurality of longitudinal contact trains by which an electrical connection between them is made when a contact sledge 130 is mechanically slid over the contact pads. The contact pads are connected through the PCB to internal conductor layers that interconnect with other contact pads. It should be noted that although the switch matrix of the embodiment is configured for cross-connecting line pairs, it is possible for the matrix to connect any line in a set of input lines to any line in a set of output lines in a so-called any-to-any configuration. Each of the contact sledges 130 are driven the contact train by a sledge positioning screw 120, which are rotated by individual stepper motors 140. The stepper motors are selectively engageable with the sledge positioning screws 120 to provide longitudinal movement of the contact sledge 130 along the axis of the positioning screw 120. Rotating the positioning screw 120 in the opposite direction reverses the direction of contact sledge 130. Using a plurality of stepper motors 140 is effective in driving the contact sledges 130 and has the added benefit in that failure of a motor leaves the switch matrix board largely operational. It should be noted that the invention is not limited to the use of stepper motors since other types of motors may also be used. However, the use of one motor per positioning screw is relatively costly. This becomes a significant consideration since an MDF can contain hundreds of termination blocks, each may be potentially connected to a switch matrix board in a modular-like manner resulting in the use of tens of hundreds of motors. Moreover, coordinating such large numbers motors requires a more complex control unit adding cost and complexity to the system.

Figure 2:
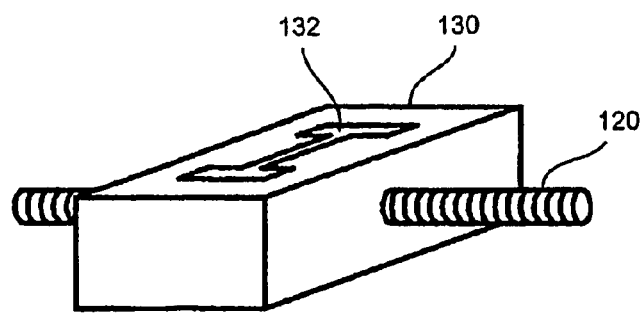
FIG. 2 shows a perspective view of the sliding contact sledge used in the switch matrix board of the invention.

FIG. 2 shows a perspective view of the sliding contact sledge 130 used in the switch matrix board of the invention. The contact sledge is elongated and has contact springs 132 for making contact between two pairs of contact points. An additional pair of contact springs can be included on the contact sledge for detecting its position on the matrix. The contact sledge body contains a threaded hole into which the positioning screw 120 turns to drive the contact sledge to make contact with the appropriate contacts on the switch matrix board. The positioning screw 120 is connected to and driven by a motor e.g. a stepper motor such that reversing its direction moves the sledge in the other direction. A plurality of motor drivable contact sledges are included in the switch matrix of the cross-connect boards to enable automation of cross-connection of the line pairs serviced by the board. The mechanical nature of the switching action of the matrix board provides high operating reliability under a wide range of temperatures.

Figure 3:
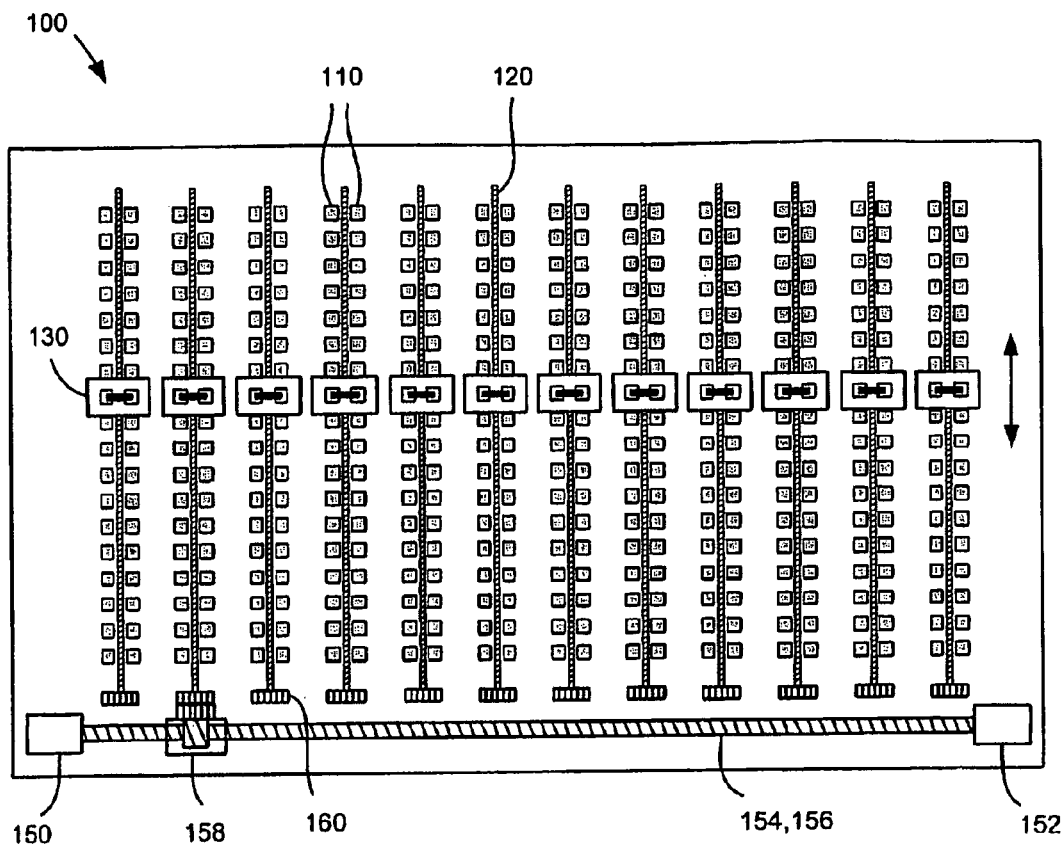
FIG. 3 is a diagrammatic top view of the exemplary switch matrix using drive means operating in accordance with a second embodiment of the invention.

FIG. 3 is a diagrammatic top view of the exemplary switch matrix operating in accordance with a second embodiment of the invention. In the embodiment, the drive means comprises two stepper motors (150,152) i.e. a first motor driving a top lateral positioning screw 154 and the second motor drives a bottom lateral positioning screw 156 (not shown). The lateral positioning screws 154 and 156 operate together to laterally position and induce stationary rotation in lateral drive gear 158. The stepper motors (150,152) operate in combination to move the lateral drive gear 158 to a position where it can engage a specific sledge positioning screw gear 160. Once the lateral drive gear 158 is selectively positioned it engages and rotates the sledge positioning screw gear 160 causing the contact sledge 130 to move longitudinally to cross-connect the desired lines.

The motion of the lateral drive gear 158 is motivated and controlled in the following manner. For example, when only one of the stepper motors is operating e.g. stepper motor 150 rotates the top lateral positioning screw 154 clockwise, movement of the lateral drive gear 158 is induced to the right. Similarly, when stepper motor 150 rotates the top lateral positioning screw 154 counter-clockwise, then the lateral drive gear 158 moves to the left. Once the lateral drive gear 158 is correctly positioned it can then engage the sledge positioning screw gear 160. When both stepper motors turn at the same speed in opposite directions, the lateral drive gear 158 rotates in a stationary position turning the sledge positioning screw 120. The lateral drive gear 158 is able to remain stationary while rotating in the other direction when the stepper motors turn in the opposite directions. It should be noted that the lateral movement and rotational effect of lateral drive gear 158 can be achieved by operating the bottom stepper motor 152 in place of the upper motor 150 in the sequence above.

Drive Mechanism

Figure 4:
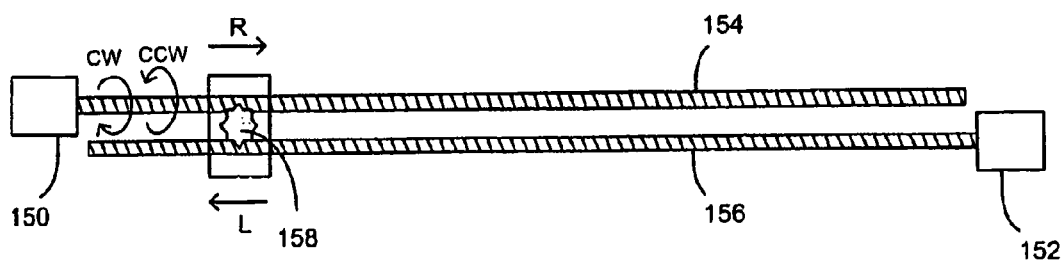
FIG. 4 shows a side view of the drive mechanism using the dual stepper motor arrangement of the second embodiment.

FIG. 4 shows a side view of the drive mechanism using the dual motor arrangement of the second embodiment. The operation of the motor and drive assembly can clearly be seen in that the first and second drive motors 150 and 152 are connected to the top and bottom lateral positioning screws 154 and 156 respectively. When the second drive motor 152 is in a motionless state, the lateral drive gear 158 moves to the right R when the first drive motor 150 rotates the top lateral positioning screw 154 in the clockwise (CW) direction. Likewise, the lateral drive gear 158 is moved to the left L when the first drive motor 150 turns the top lateral positioning screw 154 counter-clockwise (CCW). This is due to the direction of the threads on the positioning screws. When the lateral drive gear 158 is positioned correctly to engage the appropriate sledge positioning screw gear 160, the lateral drive gear is induced to rotate CW while laterally stationary when both the top and bottom lateral positioning screws 154 and 156 turn at the same speed but in opposite directions i.e. CW and CCW respectively. Similarly, the lateral drive gear is made to rotate CCW while laterally stationary when both the top and bottom lateral positioning screws 154 and 156 turn at the same speed but in opposite directions i.e. CCW and CW respectively. Accordingly, the rotating lateral drive gear 158, while engaged with the sledge positioning screw 120 via gear 160, drives the sledge toward the appropriate contact pads 110 for cross-connecting the line pair.

Since the termination blocks are housed within the limited confines of the MDF cabinet box, which puts a premium on space, it is of interest to reduce the size of the switch matrix and to drive as many cross-connects as possible on a single termination block. To that end, the switch matrix board capacity can be effectively doubled by providing contact pads on both sides of a switch matrix board and operating it as a complete unit. This can be done by sandwiching the center switch matrix board between two PCB boards, which allows the unit to be attached to the termination block without physically interfering with neighbouring units.

Figure 5:
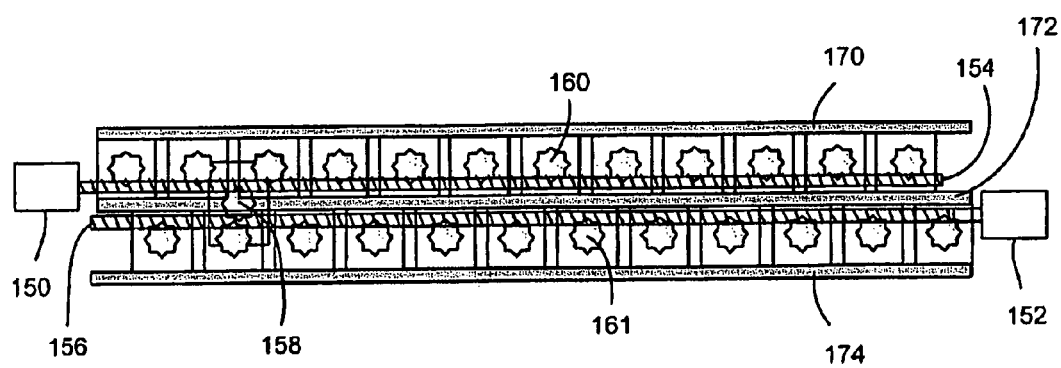
FIG. 5 shows a side view of the switch matrix assembled in a modular package.

FIG. 5 shows a side view of the switch matrix assembled in the stacked configuration using a center PCB 172 sandwiched between a top PCB board 170 and bottom PCB board 174. Contact pads are formed on both the upper and bottom surfaces of the center PCB 172 such that the upper surface contact pads cooperate to cross-connect line pairs using the upper switch matrix and the bottom surface contact pads cooperate to cross-connect line pairs using the bottom switch matrix. The first and second drive motors (150, 152) rotate the top and bottom lateral positioning screws 154 and 156 respectively to drive the lateral drive gear 158 between the two switch matrices. The top switch matrix is positioned by an offset of 180° relative to the bottom switch matrix, which allows the lateral drive gear 158 to selectively engage any of the upper sledge positioning screw gears 160 or bottom sledge positioning screw gears 161. The contact sledges are positioned and controlled by the motors using the rotation sequences described above.

Figure 6:
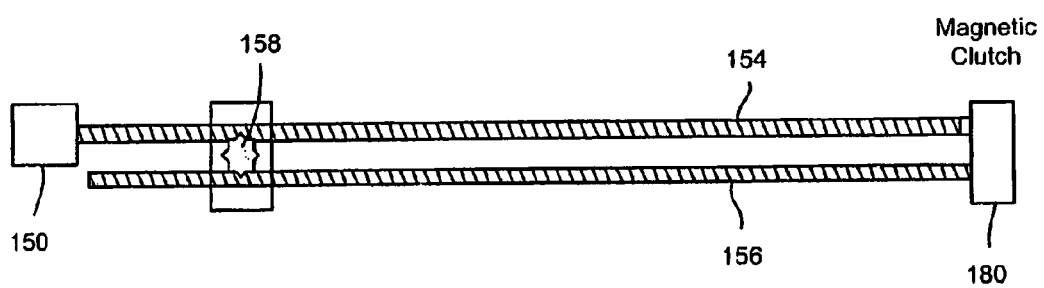
FIG. 6 shows a side view of the drive mechanism using a single drive motor and clutch assembly operating in accordance with a third embodiment.

FIG. 6 shows a side view of the drive mechanism using a single drive motor together with a clutch assembly operating in accordance with a third embodiment. Drive motor 150 rotates the upper and lower lateral positioning screws 154 and 156 via a magnetic clutch assembly 180 in order to move the lateral drive gear 158. By way of example, the lateral drive gear 158 moves right when the upper lateral positioning screw 154 rotates CW and the lower lateral positioning screw 156 is not rotating. This occurs when the drive motor 150 is rotating and the magnetic clutch 180 is disengaged. Similarly, leftward motion of the lateral drive gear 158 is induced when the upper lateral positioning screw 154 rotates CCW with a stationary lower lateral positioning screw 156 caused by a disengaged clutch. Once the lateral drive gear 158 is in position stationary rotation is induced when the upper and lower lateral positioning screws rotate in opposite directions, which occurs when the magnetic clutch 180 is engaged. An advantage of the single motor configuration is that both lateral positioning screws are inherently always synchronized when both are turning, which is important for maintaining stationary rotation of the lateral drive gear 158. The operation of the magnetic clutch is controlled by applying an electrical pulse from the drive motor control unit. Operating a single motor allows use of less complex control circuitry than would otherwise be necessary for maintaining synchronization relative to the two-motor configuration.

Position Detection

It is necessary to accurately detect the position of the contact sledges on the switch matrix board both in cross-connected position and in the break position (between cross-connects). In addition to enabling the proper positioning of the contact sledges on the contact pads, accurate position detection enables two additional important maintenance related functions for a remotely, automated switch matrix board. Firstly, it enables the motors and drive mechanism to be "exercised" without disrupting existing service connections. As part of regular maintenance procedures it is often advantageous to "exercise" the moving components periodically to help keep them in working condition. This becomes important over time since cross-connects on the switch matrix board may experience long periods of inactivity until it is next called upon to change states. This is especially the case when there is an established phone service for a line that may be connected for many years, for example. It also becomes possible to "exercise" the mechanism while maintaining the break position i.e. when there is no existing cross-connect established. The maintenance exercise routines can be performed remotely from the central office without having to send a technician to the MDF site, which is of great advantage. Secondly, the other maintenance benefit is that the contact pads can be "cleaned" while maintaining the existing cross-connect. There is a small range in which the contact springs can move backwards and forwards over the contact pads without breaking the connection. Moving the contact springs periodically over the contact pads keeps the pads clear from any dust or particles that may have accumulated over time that could interfere with the electrical connection.

Figure 7:
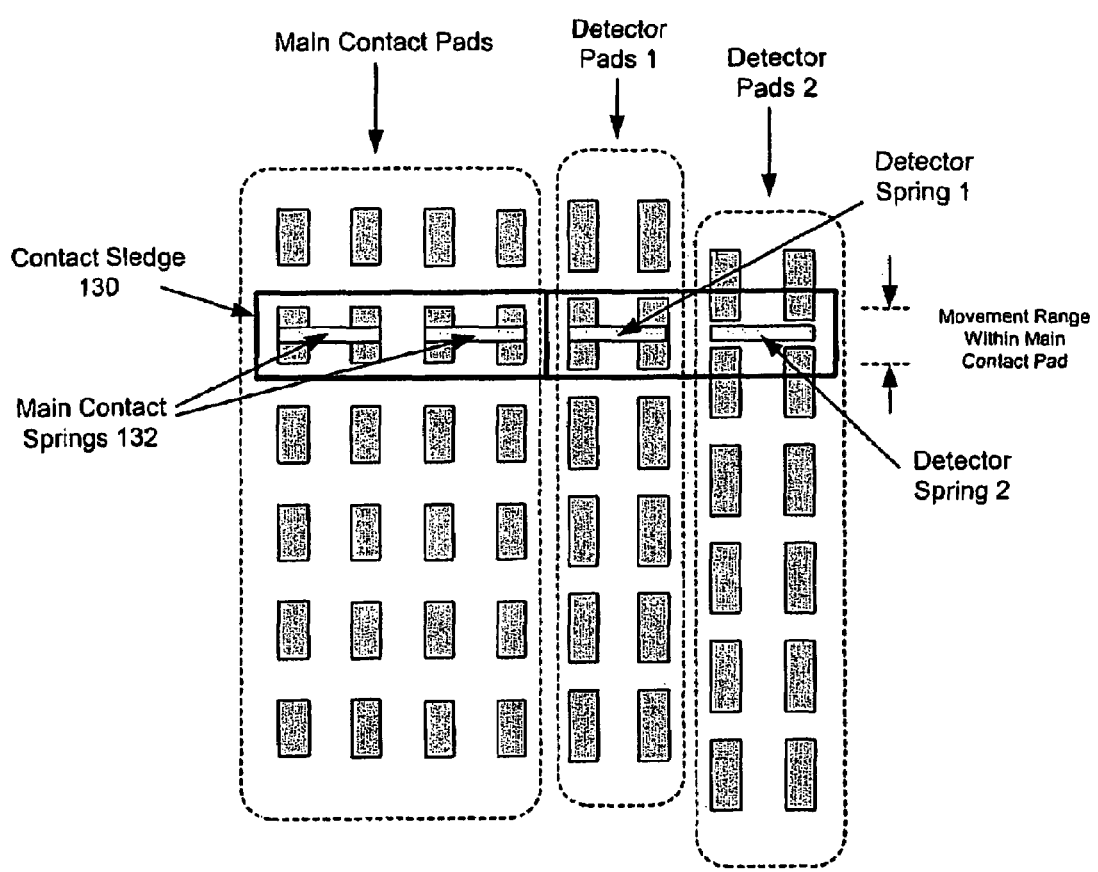
FIG. 7 shows a partial view of the switch matrix board comprising contact pads for the position detection system.

FIG. 7 shows a partial view of the switch matrix board comprising contact pads for the position detection system used in the invention. The contact sledge 130, in addition to the two main sets of contact springs 132 used for the cross-connects, includes to additional sets of contact springs i.e. Detector Spring 1 and Detector Spring 2. All sets of contact springs move together in concert, each making contact with a different column of contact pads. The two detector springs work in combination to detect whether the main contact springs 132 are positioned on the center of the contact main pads, somewhere on the contact main pads (but not the center), or in the break position i.e. the main contact springs 132 are off the contact main pads. Table 1 below summarizes the procedure for detecting the position of the main contact springs.

TABLE 1

| MAIN CONTACT SPRINGS | DETECTOR SPRING 1 | DETECTOR SPRING 2 |
| --- | --- | --- |
| Centered on Main Contact Pads | On | Off |
| Somewhere on Main Contact Pads (not center) | On | On |
| Break Position | Off | On |

As seen from table 1, the main contact springs 132 are centered on the main contact pads when Detector Spring 1 makes contact with Detector Pads 1 and Detector Spring 2 does not make contact with Detector Pads 2. Furthermore, the main contact springs 132 are positioned somewhere on the main contact pads when Detector Spring 1 makes contact with Detector Pads 1 and Detector Spring 2 makes is in contact with Detector Pads 2. Moreover, the main contact springs 132 are determined to be in the break position when Detector Spring 1 does not make contact with Detector Pads 1 and Detector Spring 2 is in contact with the Detector Pads 2.

The position detection system described enables the contact sledge to be positioned on the selected main contact pads in the desired way. Likewise, it is possible to "clean" the main contact pads by moving the contact sledge 130 back and forth within the movement range while maintaining contact between the main contact springs 132 and main contact pads. Similarly, movement of the sledge within the break position can also be carried out when necessary. The information from the detector springs is fed into a controller located on the switch matrix board that controls the drive mechanism.

Figure 8:
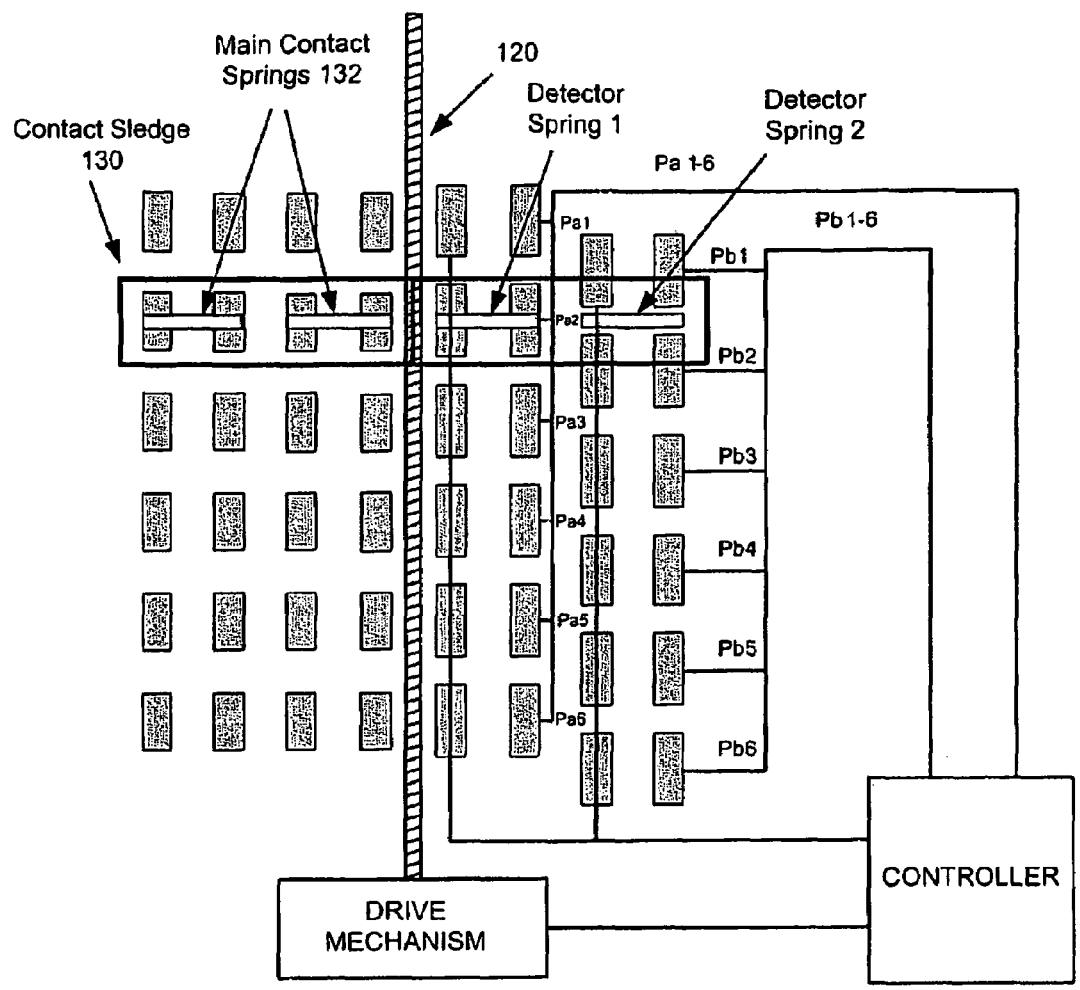
FIG. 8 shows a partial view of the switch matrix board of FIG. 7 comprising the position detection system and drive mechanism.

FIG. 8 shows the partial view of the exemplary switch matrix board of FIG. 7 comprising the position detection system and drive mechanism. It should be noted that only a single contact train is shown for simplicity of illustration and that all contact trains are configured to function in a corresponding manner. With the position detection system it is possible to know where the contact sledge 130 is on the switch matrix at all times. The position of the contact sledge 130 can be determined at any time by sensing the present position with Detector Pads 1 and 2 as described above. Along the contact train, each of the detector pads are connected to a controller unit, typically a microprocessor, that is able to sense when the detector spring makes contact i.e. when Detector Spring 1 makes contact with pads Pa1-6 and when detector spring 2 makes contact with pads Pb1-6. For example, the controller is able to detect that detector spring 1 is in contact with contact pads Pa2 when a short circuit is created between the pads. At the same time, the controller detects that Detector Spring 2 in not in contact with the pads therefore the main contact springs must be located in the center position. The controller also governs the drive mechanism that moves the contact sledge 130 to the appropriate position by rotating the positioning screw 120.

Cross-Connect Module

The switch matrix board of the present invention can be adapted for use with a remotely automated cross-connect system for telecommunication networks.

Figure 9:
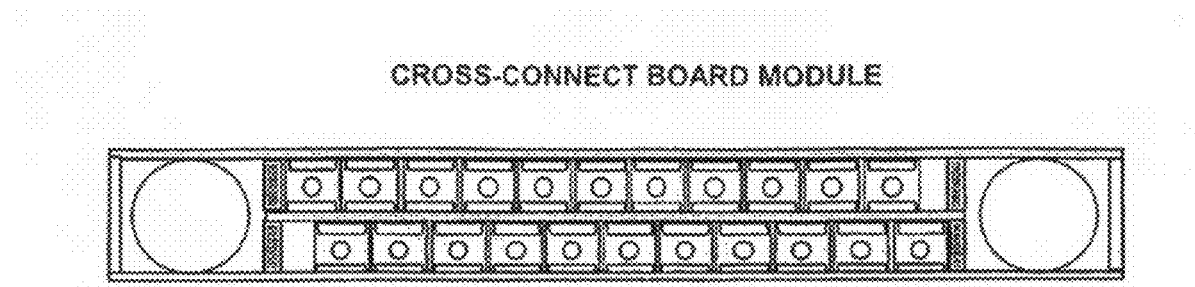
FIGS. 9 and 10 show the present invention incorporated into a modular cross-connect board for use in installing in an MDF cabinet.
Figure 10:
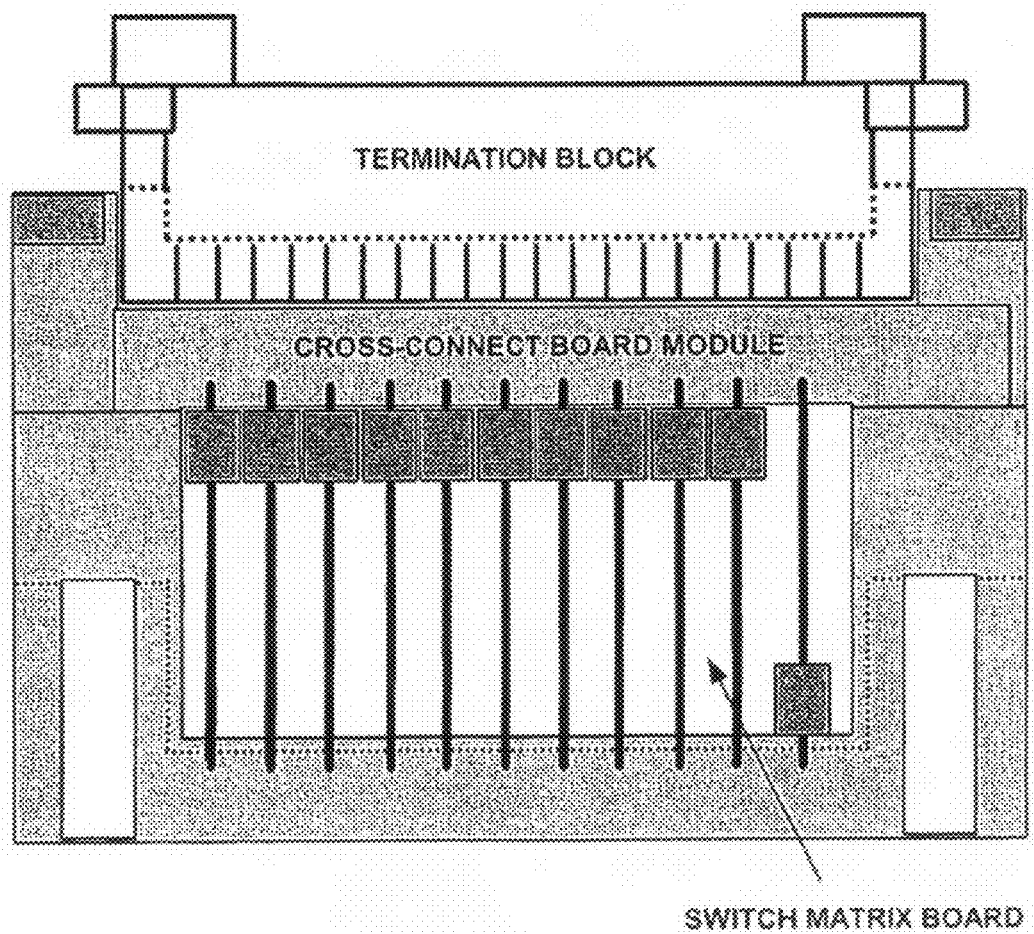

FIG. 9 depicts a side view of the switch matrix of the present invention incorporated into a modular cross-connect board for use in an automated cross-connect system. FIG. 10 illustrates how the cross-connect board is inserted into the slot of a KRONE LSA-Plus termination block that are used in many central office MDFs. Those skilled in the art will realize that the cross-connect boards can be adapted to mate with different configurations of termination blocks with relatively minor modifications to the connector arrangement. The interconnected modular cross-connect boards are installed into distribution frame locations within a telecommunication network to provide remotely automated cross-connect functionality.

Figure 11:
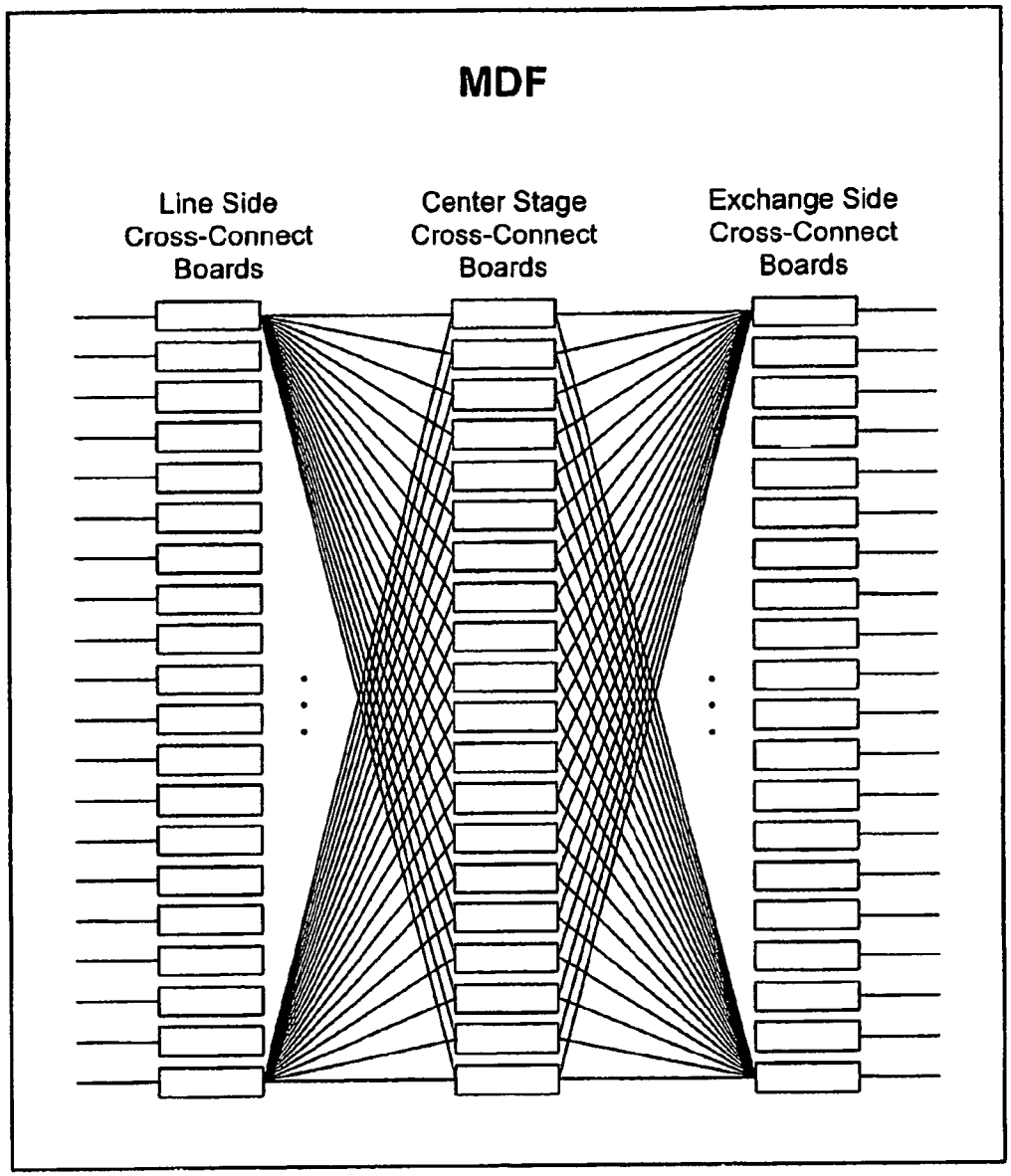
FIG. 11 conceptually depicts an exemplary MDF cabinet installed with modular cross-connect boards.

FIG. 11 shows an exemplary central office MDF cabinet installed with modular cross-connect boards containing the switch matrix boards of the present invention. The MDF comprises a column of cross-connect boards attached to the termination blocks connected to the output subscriber lines. Similarly the column of cross-connect boards are attached to the termination blocks on the exchange side. The example also shows the use of an optional center stage interconnected with the subscriber and exchange sides boards. The center stage comprises a number of additional cross-connect boards to which more cross-connect boards can be added as the capacity of the MDF increases.

Figure 12:
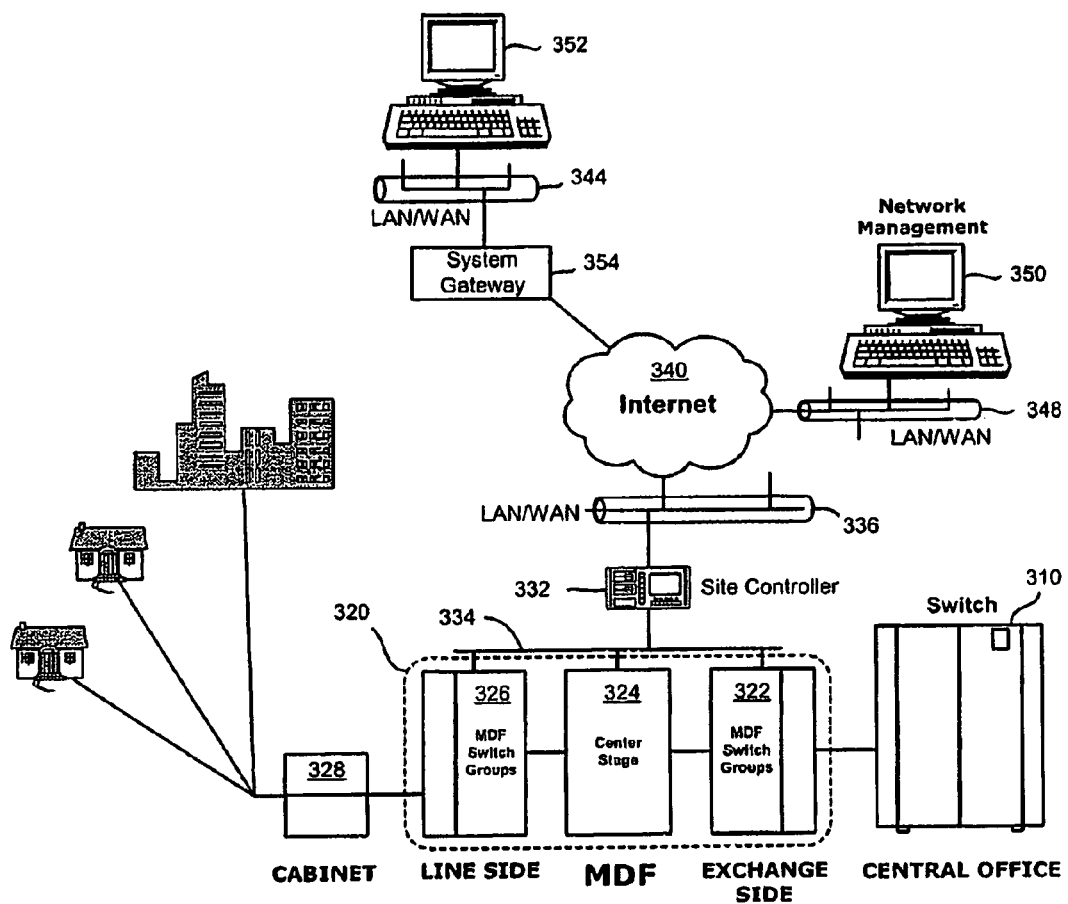
FIG. 12 illustrates an remotely automated cross-connect system employing the switch matrix boards of the present invention.

FIG. 12 is an illustration of an exemplary remotely controlled automated cross-connect system with installed modular switch matrix boards of the present invention. The automated cross-connect system is a central office application that is largely concentrated with automating the cross-connections between the exchange side and the line side within the main distribution frame (MDF) 320 MDF 320 comprises a center stage 324 of cross-connect boards interconnected between the standard the exchange side MDF switch groups on the exchange side 322 and on the line side 326. The exchange side line pairs are connected to the ports at the central office switch 310, where at one end are terminated in blocks on the exchange side switch groups 322. Similarly, the output lines on the line side are terminated in blocks in the line side switch groups 326, which in the simplified layout, feeds out to a street cabinet or drop point 328 typically located in the vicinity of the subscribers. A site controller 332 can be linked via a TCP/IP Ethernet based communication link or LAN 336 to direct a number of automated MDFs under this site. The site controller keeps track of the cross-connects of line pairs on all switch matrix boards. Another important function is that it retains routing information necessary to direct the making of a new cross-connect for a specific line pair when instructed to do so by the service provider.

To remotely establish, remove, or modify a cross-connect on a system level, the site controller receives cross-connect switching information from e.g. a remote computer 352 at the central command location communicating via the LAN/Internet using TCP/IP protocols. This enables control from a remote computer located virtually anywhere in the world to access the system using secure Internet transmission protocols. The site controller converts the switching information received from the remote computers 350 and 352 into appropriate command sequences. All switch matrix boards, and thus individual cross-connects, in the remote switch groups operated under the site controller are selectable. Full automation is achieved by selectively moving the appropriate contact sledge to the desired position on the switch matrix board using the drive means and positioning system as described in the present invention. Furthermore maintenance and diagnostic procedures can be carried out via computer terminal 352 located at the central office.

The foregoing description of the preferred embodiments of the invention has been presented for purposes of illustration and description. It is not intended to be exhaustive or to limit the invention to the precise forms disclosed, since many modifications or variations thereof are possible in light of the above teaching. Accordingly, it is to be understood that such modifications and variations are believed to fall within the scope of the invention. The embodiments were chosen to explain the principles of the invention and its practical application, thereby enabling those skilled in the art to utilize the invention for the particular use contemplated. Still, it should be noted that the invention can be applied to switch matrices used in other applications such as patch panels used in connecting data communications equipment such as a LANs to the other networks or electronic systems, for example. It is therefore the intention that the following claims not be given a restrictive interpretation but should be viewed to encompass variations and modifications that are derived from the inventive subject matter disclosed.

The invention claimed is:

1. An automated switching apparatus for electrically cross-connecting any line or lines in a set of input lines to any line or lines in a set of output lines, said apparatus comprising:
 a switch matrix comprising a plurality of sliding contact means for selectively connecting any of the input lines to any of the output lines;
 drive means for moving the contact means on the switching apparatus;
 position detection means for detecting the position of the contact means on the switching apparatus; and
 control means connected to said drive means and to said position detection means for accurately moving the contact means to a desired position on the switching apparatus wherein,
 said switch matrix includes a plurality of electrically conducting main contact pads disposed thereon and arranged in a plurality of contact trains, and
 said contact means includes a set of main contact springs that are slidably engageable with said main contact pads for cross-connecting the lines, and
 said switch matrix further comprises a first and a second set of detector pads disposed thereon in proximity with said contact trains, and wherein
 the contact means further includes corresponding sets of detector springs that are slidably engageable with said first and second set of detector pads for detecting the precise position of the contact means.

2. The apparatus according to claim 1 wherein, said switch matrix sliding comprises a plurality of positioning screws driven by the drive means for moving the contact means.

3. The apparatus according to claim 2 wherein, the positioning screws are each driven by an electric motor that is controlled by the control means.

4. The apparatus according to claim 2 wherein, said drive means further comprises:
 a first and a second lateral positioning screws driven by rotary drive means; and
 a lateral drive gear engaged between the first and second lateral positioning screws,
 whereby the combination in rotation of the lateral positioning screws induces lateral movement of the lateral drive gear to a position to selectively engage one of said positioning screws, and wherein the synchronized rotation of the lateral positioning screws induces stationary rotation of the lateral drive gear to rotate the selected positioning screw for moving the contact means.

5. The apparatus according to claim 4 wherein, said first and second lateral positioning screws are driven by electric motors that are controlled by the control means.

6. The apparatus according to claim 4 wherein, the rotating drive means comprises a electric motor driving the first lateral positioning screw at one end, wherein the other end is coupled to a clutch arrangement that is selectively engageable to synchronously rotate the second lateral positioning screw in a manner that induces lateral movement and stationary rotation in the lateral drive gear.

7. The apparatus according to claim 1 wherein, the switch matrix is configured in a stacked arrangement for increasing the number of cross-connectable lines.

8. The apparatus according to claim 7 wherein, switch matrix is incorporated into a plurality of cross-connect modules for installation into a distribution frame, said plurality of cross-connect modules operate in cooperation with a automated cross-connect system for remotely establishing, removing, or modifying cross-connects.

9. A method of automating a switch matrix apparatus for cross-connecting a line or lines in a set of input lines to any line or lines in a set of output lines, said switch matrix comprising a plurality of electrically conducting contact pads disposed thereon, a plurality of contact means driven by a plurality of corresponding contact means positioning screws such that the contact means are slidably engageable with the contact pads for cross-connecting the lines, and position detection means for detecting the position of the contact means on the switch matrix, the method comprising the steps of:
 displacing the contact means to engage a predetermined set of contact pads by rotating the contact means positioning screw;
 detecting the position of the contact means; and
 adjusting, if necessary, the position of the contact means based on the detected position, wherein
 the contact means is accurately positioned on the switch matrix by control means in communication with the position detection means and an electric motor or motors divining the positioning screws, and
 the contact means further includes corresponding sets of detector springs that are slidably engageable with a first and a set of detector pads for detecting the precise position of the contact means.

10. The method according to claim 9 wherein, a lateral drive gear is engaged between a first and a second lateral positioning screws, the operation for displacing the contact means comprising the steps of:
 rotating the first lateral positioning screw in either a clockwise or counter-clockwise direction, while keeping the second lateral positioning screw stationary, to induce lateral movement of the lateral drive gear in a first lateral direction or a second lateral direction respectively;
 positioning the lateral drive gear to engage a selected contact means positioning screw; and
 synchronously rotating the first and second lateral positioning screws to induce stationary rotation of the lateral drive gear to selectively engage and rotate the contact means positioning screw to move the contact means to establish cross-connect.

11. The method according to claim 10 wherein, the contact means positioning screws are rotated by separate electric motors.

12. The method according to claim 9 wherein, the first and second lateral positioning screws are each rotated by an electric motor.

13. The method according to claim 10 wherein, an electric motor drives the first lateral positioning screw at one end and such that the other end is coupled to a clutch arrangement being selectively engageable to synchronously rotate the second lateral positioning screw in a manner that induces lateral movement and stationary rotation of the lateral drive gear.

14. The method according to claim 9 wherein, the switch matrix arrangement is incorporated into a plurality of cross-connect modules for installation into a distribution frame, the plurality of cross-connect modules operate in cooperation with a automated cross-connect system for remotely automating the establishment or removal of cross-connects.

\* \* \* \* \*